United States Patent [19]

Ferber et al.

[11] Patent Number: 4,738,033
[45] Date of Patent: Apr. 19, 1988

[54] RAPID CHANGE HOLDER FOR PROBE PINS

[75] Inventors: Wolfgang Ferber, Lahnau; Erich Schuster, Huettenberg, both of Fed. Rep. of Germany

[73] Assignee: Ernst Leitz Wetzlar GmbH, Wetzlar, Fed. Rep. of Germany

[21] Appl. No.: 883,958

[22] Filed: Jul. 10, 1986

[30] Foreign Application Priority Data

Jul. 22, 1985 [DE] Fed. Rep. of Germany ....... 3526108

[51] Int. Cl.⁴ .......................................... B23Q 3/155
[52] U.S. Cl. ........................................ 33/559; 279/4; 403/187; 403/322; 403/325
[58] Field of Search ............... 33/559, 556; 279/4, 279/106, 89, 97; 403/330, 322, 325, 187; 24/637, 651

[56] References Cited

U.S. PATENT DOCUMENTS

| 2,768,830 | 10/1956 | Janson ........................... 279/4 |
| 2,958,533 | 11/1960 | Benjamin et al. .................. 279/4 |
| 3,270,605 | 9/1966 | Schott et al. . |
| 3,466,715 | 9/1969 | McCarthy ..................... 403/187 X |
| 4,339,714 | 7/1982 | Ellis ............................. 33/559 X |
| 4,637,119 | 1/1987 | Schneider ....................... 29/568 |

FOREIGN PATENT DOCUMENTS

| 0128464 | 6/1983 | European Pat. Off. . |
| 0142373 | 11/1984 | European Pat. Off. . |
| 3117795 | 4/1982 | Fed. Rep. of Germany . |
| 205984 | 1/1984 | Fed. Rep. of Germany . |
| 3320127 | 12/1984 | Fed. Rep. of Germany . |
| 2047133 | 3/1980 | United Kingdom . |
| 2118075 | 4/1983 | United Kingdom . |

Primary Examiner—William D. Martin, Jr.
Attorney, Agent, or Firm—Schwartz, Jeffery, Schwaab, Mack, Blumenthal & Evans

[57] ABSTRACT

A mount on the probe head of a coordinate measuring machine is described. For rapid change of a probe pin carrier, accommodating at least one probe pin, which is drawn against a bearing which clearly determines the position of the probe pin carrier in the probe head, a mechanical clamp mechanism, which acts on the bearing part of the probe pin carrier, and compression-creating and tension-creating media, actuating the clamp mechanism, are provided in the probe head.

15 Claims, 1 Drawing Sheet

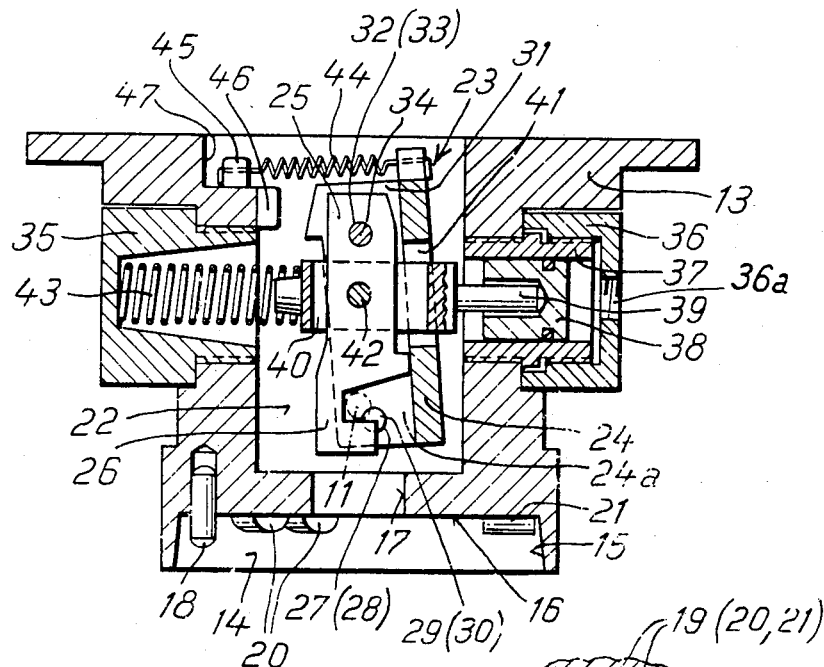
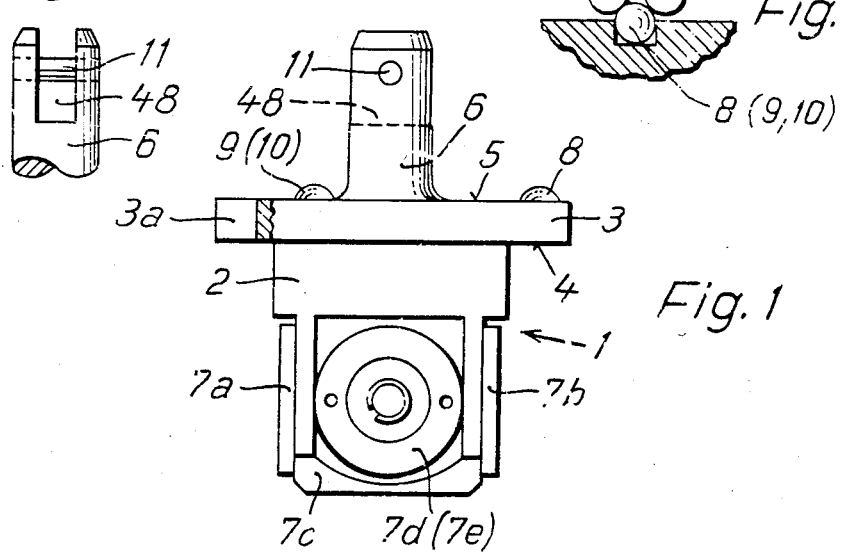

RAPID CHANGE HOLDER FOR PROBE PINS

BACKGROUND OF THE INVENTION

The invention relates to a mount, on the probe head of a coordinate measuring machine, for rapid change of a probe pin carrier, accommodating at least one probe pin, which is drawn against a bearing which clearly determines the position of the probe pin carrier in the probe head.

In accordance with the particular measuring tasks, such mounts are necessary for swift and uncomplicated attachment of the probes or probe combinations to the probe head and are particularly useful in the automatic measurement of differing parts.

A mount to that end for exchangeable attachment of a probe pin or a probe pin combination to the probe head of a coordinate measuring machine is known from German Offenlegungsschrift No. 3,320,127, in which an electrically operating clamp device draws the connecting element of the probe pin or the probe pin combination against a bearing, which clearly determines the position of the probe pin, in the mount on the probe head.

The disadvantage of this device is that only limited clamping forces can be applied by magnetic clamping means, so that the probe pin combinations can fall out of the change device on collision, and that heat, which has a disadvantageous effect on both the accuracy of engagement of the probe pins and on the measurement accuracy, when the probe pins are changed frequently, is generated during switching of the electromagnets or electric motors.

SUMMARY OF THE INVENTION

It is therefore an object of the present invention to provide an improved coordinate measuring machine.

It is also an object of the present invention to provide an improved mount for a coordinate measuring machine.

It is a further object of the present invention to provide an improved mount, of simple construction, for the probe head of a coordinate measuring machine.

Another object of the invention is to provide an improved coordinate measuring machine probe head mount with which a probe pin carrier, accommodating at least one probe pin, can be exchanged rapidly.

It is still another object of the invention to provide an improved coordinate measuring machine probe head mount that prevents heat buildup and prevents the probe pin combinations from falling out of the change device on collision.

Yet another object of the invention is to provide a simply constructed mount on the probe head of a coordinate measuring machine, with which mount a probe pin carrier, accommodating at least one probe pin, can be exchanged rapidly without the disadvantageous heat buildup mentioned above and which allows automatic rapid change, and prevents the probe pin combinations from falling out of the change device on collision.

In accordance with one aspect of the present invention, these objects are achieved by provision of a coordinate measuring machine probe head mount having a housing, a mechanical clamp mechanism mounted in the housing which is adapted to act on a bearing part of a probe pin carrier having at least one probe pin, and a means in the housing for actuating the mechanical clamp mechanism.

These objects are further achieved, in accordance with another aspect of the present invention, by provision of a coordinate measuring machine comprising a probe head; and a probe head mount, connected to the probe head, which comprises a housing, a mechanical clamp mechanism, that is mounted in the housing and is adapted to act on a bearing part of a probe pin carrier having at least one probe pin, and means for actuating the mechanical clamp mechanism, the actuating means located in the housing, such that the coordinate measuring machine operates to exchange one probe pin for another probe pin.

According to one preferred embodiment of the present invention, the measuring machine probe head mount mentioned above has a rocker lever clamp mechanism which comprises a first member having a lower end pivotable about a first pin and a second member having an upper end connected by a second pin to the upper end of the first member, the second pin being parallel to the first pin, such that the second member is pivotable about the second pin. The measuring machine probe head mount also preferably includes a coupling device connected to the rocker lever clamp mechanism, wherein the coupling device has a groove, open on one side, having parallel edges. Alternatively, the mount coupling device can include a groove, open on one side that has conically converging edges.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An illustrative embodiment of the invention is described in further detail below and is represented schematically in the drawing, in which:

FIG. 1 shows a probe pin carrier,

FIG. 2 shows a sectional side view of the mount, according to the invention, which is mounted on a probe head, not represented, of a coordinate measuring machine, FIG. 3 shows a known three-point bearing for the probe pin carrier, and FIG. 4 shows a partial side view of the probe pin carrier according to FIG. 1.

DETAILED DESCRIPTION OF THE PREFERRED EMBODIMENTS

The schematic representation in FIG. 1 shows a one-piece probe pin carrier 1, which is divided into a lower part 2, a flange 3 with parallel surfaces 4, 5 and a cylinder 6. Threaded sockets or jack sockets 7a–7e are provided in the lower part 2 to accommodate probe pins or probe pin combinations, not represented here.

Balls 8, 9 and 10 are set into the surface 5, facing the cylinder 6, of the flange 3 at the same distance from the axis of the probe pin carrier 1 and staggered by 120° to one another. In addition, the flange 3 is provided, on its outer periphery, with a groove 3a, which, however, can be replaced by a bore hole. The function of the balls 8-10 and the groove 3a or the bore hole will be described further below.

Referring to FIG. 4, a slot (48) is provided at the free end of the cylinder 6 parallel to the axis of the latter. A cylinder pin 11, the function of which will also be described further below, is mounted perpendicular to the slot.

A probe pin change device, which is attached to a probe head, not represented, of a coordinate instrument, is shown schematically in the representation of FIG. 2. A flat recess (14), with slightly conical inner surfaces 15 and a planar base surface 16, and a bore hole 17 are provided in the lower part of the housing 13. An orientation pin 18 is set into the base surface (16) parallel to the axis of symmetry of the housing 13.

In addition, referring to FIG. 3, pairs of rollers 19-21, the function of which is described further below, are provided on the base surface 16 staggered at 120° to one another.

A deep recess 22 is provided in the upper part of the housing 13. A base, which is penetrated by the bore hole 17, is created between this recess and the flat recess 14.

The deep recess 22 accommodates a rocker lever clamp mechanism 23 which comprises a lever 24 of the U-shaped construction and a flat lever 25 which is provided with a coupling part 26. The side walls of the U-shaped lever 24 are each provided, at the lower end 24a, with a mounting bore hole 27, 28 into which pins 29, 30 engage, which are fixed in the housing 13 about which the U-shaped lever (24) is mounted so that it can pivot. The coupling part 26 has a groove, open on one side, that has conically converging edges. Alternatively, the edges can be parallel to each other.

A further mounting bore hole 32, 33 is provided at the upper end 31 of each of the side walls of the U-shaped lever. These accommodate a pin 34 which bears the flat lever 25 which is pivotable about the pin.

The probe pin change device or mount, provided in the probe head, has a mechanical clamp mechanism which acts on the bearing part of the probe pin carrier, and compression-creating or tension-creating media, which actuate the clamp mechanism.

A spring housing 35 is fixed on the left of the central region of the housing 13 and a cylinder pot 36, which accommodates a hydraulic cylinder or pneumatic cylinder 37 with piston 38, is fixed to the right of the central region of the housing 13, aligned with the axis of the spring housing 35.

A push rod 39 of a slider 40, which, passing through an aperture 41 in the rear wall of the U-shaped lever 24, grasps the flat lever 25, is guided with lateral play in the piston 38. The flat lever 25 is connected positively but in an articulated manner with the slider 40 by means of a connecting pin 42.

The end of the slider 40 which projects beyond the flat lever 25 serves as support for a compression spring 43, which is mounted in the spring housing 35.

A tension spring 44 is fixed with one end to the U-shaped lever 24, and with the other end is hooked to a retaining bolt 45 which, together with a stop 46, is mounted in an eccentric extension 47 of the deep recess 22 in the housing 13.

The mount described hitherto can thus apply the necessary clamp force for retention of the probe pin carrier 1 by spring force or by compressed air. In the present case, the compression spring 43 serves for clamping. On failure of the compressed air, the clamp force, which is generated by the compression spring 43, is maintained.

To insert the probe pin carrier 1, an "opening" procedure is carried out. The "opening" procedure is initiated by feeding compressed air through an aperture 36a to the pressure cylinder 37. The piston 38 is thereby pushed to the left and transfers the movement, via the push rod 39 and the slider 40, to the rocker lever clamp mechanism 23. Both lever 24 and flat lever 25 pivot together initially to the left about the pins 29, 30 until a stop surface of the U-shaped lever 24 comes into contact with the stop 46. This effective pivotting of flat lever 25 about pins 29, 30 causes a slight downward movement of coupling part 26, as can be seen from FIG. 2 since the pivot axis 29, 30 is essentially at the right-hand end of the engagement surface of the coupling part 26. On further application of pressure, the flat lever 25 then pivots about the pin 34 against the force of the compression spring 43 until it comes to rest on the housing wall. This pivotting about pin 34 causes a lateral movement of coupling part 26. The probe pin carrier 1 can now be introduced into the change device.

During this insertion, the probe pin carrier 1 is pre-oriented coarsely by the slightly conical inner surfaces 15 of the flat recess 14 in the lower part of the housing 13 and by the orientation pin 18, set into the base surface 16, and the groove or bore hole 3a in the flange 3 of the probe pin carrier 1.

On release of the pneumatically or hydraulically generated pressure, the lever 24 initially remains in its position under the influence of the tension spring 44, while the lever 25 pivots about the pin 34 and laterally moves the coupling part 26, of hook-shaped design, into engagement with the pin 11 of the probe pin carrier 1. The rocker lever clamp mechanism (i.e., both lever 24 and flat lever 25) then pivots about the shaft 29, 30 and locks the probe pin carrier in the three-point bearing as a result of the slight upward movement of coupling part 26. The positive coupling between probe pin carrier and probe head thereby prevents release of the carrier from the probe head if the carrier is overstressed on collision.

To change the probe pin carrier, the "opening38 procedure is carried out. The carrier can then be removed and set down on an appropriate depository.

What is claimed is:

1. A mount for securely and precisely mounting a probe pin carrier in a coordinate measuring machine probe head, comprising:
  a housing; and
  a mechanical clamp mechanism mounted in said housing and having a coupling part which is adapted to engage a bearing part of a probe pin carrier having at least one probe pin, wherein said clamp mechanism comprises:
    means located in said housing for laterally moving said coupling part into and out of engagement with the probe pin bearing part, and
    means located in said housing for axially moving said coupling part to lock the probe pin carrier into a predetermined mounted position relative to said housing, wherein said means for laterally and axially moving said coupling part comprise, a rocker lever clamp mechanism which comprises a first lever member having a lower end pivotable about a first pivot axis and a second lever member having an upper end pivotably connected at a second pivot axis to the upper end of said first member, said second pivot axis being parallel to said first pivot axis.

2. A mount as claimed in claim 1, wherein the second lever member includes at its lower end said coupling part which grips the bearing part of the probe pin carrier.

3. A mount as claimed in claim 2, wherein the coupling part comprises a laterally extending groove, open on one side, having parallel edges.

4. A mount as claimed in claim 2, wherein the coupling part comprises laterally extending a groove, open on one side, having conically coverging edges.

5. A mount as claimed in claim 1, further comprising means, on said housing, for rotationally orienting the probe pin carrier with respect to said housing by registering with a recess in the probe pin carrier.

6. A mount as claimed in claim 1, wherein said clamp mechanism further comprises means for sequentially actuating said lateral moving means and said axial moving means.

7. A mount as claimed in claim 6, wherein the sequential actuating means comprises a piston-and-cylinder device connected to said second lever member.

8. A mount as claimed in claim 7, wherein the sequential actuating means further comprises a first spring opposing said piston-and-cylinder device and a second spring biasing said first lever member in a direction out of its position in which said coupling part locks the probe pin carrier in the predetermined mounted position.

9. A mount as claimed in claim 7, wherein the piston-and-cylinder device comprises a hydraulic device.

10. A mount as claimed in claim 7, wherein the piston-and-cylinder device comprises a pneumatic device.

11. A mount as claimed in claim 1, further comprising means disposed in said housing for preventing rotation of said probe pin carrier about an axis of symmetry when said mechanical clamp mechanism is engaged with said bearing part so as to fix said probe pin carrier in a predetermined position relative to said housing.

12. A mount as claimed in claim 11, wherein said rotation preventing means comprises at least one pair of parallel rollers being disposed on a surface of said housing, said parallel rollers receiving a ball being disposed on a surface of said probe pin carrier when said probe pin bearing part is engaged with said clamp mechanism.

13. A mount as claimed in claim 12, wherein said rotation preventing means further comprises three pairs of said parallel rollers being disposed substantially equidistant from one another.

14. A mount as claimed in claim 6, wherein said sequential actuating means simultaneously rotates said first and said second lever members about said first pivot axis until said first member contacts a stop, prior to rotating said second lever member about said second pivot axis.

15. A coordinate measuring machine, comprising:
a probe head; and
a mount for securely and precisely mounting a probe pin carrier in said probe head, comprising:
a housing; and
a mechanical clamp mechanism mounted in said housing and having a coupling part which is adapted to engage a bearing part of a probe pin carrier having at least one probe pin, wherein said clamp mechanism comprises:
means located in said housing for laterally moving said coupling part into and out of engagement with the probe pin bearing part, and
means located in said housing for axially moving said coupling part to lock the probe pin carrier into a predetermined mounted position relative to said housing, wherein said means for laterally and axially moving said coupling part, comprise a rocker lever clamp mechanism which comprises a first lever member having a lower end pivotable about a first pivot axis and a second lever member having an upper end pivotably connected at a second pivot axis to the upper end of said first member, said second pivot axis being parallel to said first pivot axis.

* * * * *